United States Patent
Li et al.

(10) Patent No.: US 12,309,836 B2
(45) Date of Patent: May 20, 2025

(54) METHOD, DEVICE AND COMPUTER PROGRAM PRODUCT FOR WIRELESS COMMUNICATION

(71) Applicant: ZTE CORPORATION, Guangdong (CN)

(72) Inventors: Ziyang Li, Shenzhen (CN); Li Tian, Shenzhen (CN); Ling Yang, Shenzhen (CN); Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 383 days.

(21) Appl. No.: 17/877,577

(22) Filed: Jul. 29, 2022

(65) Prior Publication Data

US 2023/0217490 A1    Jul. 6, 2023

Related U.S. Application Data

(63) Continuation of application No. PCT/CN2020/120946, filed on Oct. 14, 2020.

(51) Int. Cl.
*H04W 4/00* (2018.01)
*H04L 5/00* (2006.01)
*H04W 74/0816* (2024.01)

(52) U.S. Cl.
CPC ....... *H04W 74/0816* (2013.01); *H04L 5/0053* (2013.01)

(58) Field of Classification Search
CPC .......... H04W 74/0816; H04W 74/0808; H04L 5/0053
See application file for complete search history.

(56) References Cited

U.S. PATENT DOCUMENTS

| | | | | |
|---|---|---|---|---|
| 8,306,000 B2 * | 11/2012 | Mouhouche | ...... | H04L 25/03019 370/335 |
| 10,009,153 B2 * | 6/2018 | Nory | ...... | H04L 5/0094 |
| 10,854,019 B1 * | 12/2020 | Barnes | ...... | G06Q 30/0284 |
| 2012/0307728 A1 * | 12/2012 | Das | ...... | H01Q 3/04 370/328 |
| 2014/0036678 A1 * | 2/2014 | Shen | ...... | H04W 16/08 370/235 |

(Continued)

FOREIGN PATENT DOCUMENTS

| CN | 111543100 A | 8/2020 |
|---|---|---|
| JP | 2020-155955 A | 9/2020 |

(Continued)

OTHER PUBLICATIONS

Huawei et al., "Coexistence and channel access for NR unlicensed band operations" 3GPP TSG RAN WG1 Meeting #94bis, R1-1810126, Oct. 8, 2018, Chengdu, China (13 pages).

(Continued)

*Primary Examiner* — Stephen M D Agosta
(74) *Attorney, Agent, or Firm* — Foley & Lardner LLP

(57) ABSTRACT

Method, device and computer program product for wireless communication are provided. A method includes: switching, by a wireless communication node, from a first uplink Listen Before Talk (LBT) scheme to a second uplink LBT scheme in response to a congestion level of an uplink channel between the wireless communication node and a network device or in response to a first or second downlink signal including LBT scheme switching information transmitted from the network device.

17 Claims, 5 Drawing Sheets

100 switching, by a wireless communication node, from a first uplink L LBT scheme to a second uplink LBT scheme in response to a congestion level of an uplink channel between the wireless communication node and a network device or in response to a first or second downlink signal including LBT scheme switching information transmitted from the network device 110

(56) References Cited

U.S. PATENT DOCUMENTS

| | | | | |
|---|---|---|---|---|
| 2015/0103782 | A1* | 4/2015 | Xu | H04W 16/14 |
| | | | | 370/329 |
| 2016/0105897 | A1* | 4/2016 | Liu | H04W 72/54 |
| | | | | 370/235 |
| 2016/0143014 | A1* | 5/2016 | Mukherjee | H04L 5/0039 |
| | | | | 370/330 |
| 2016/0338053 | A1* | 11/2016 | Park | H04W 74/0808 |
| 2017/0264419 | A1* | 9/2017 | Fakoorian | H04L 5/14 |
| 2017/0353972 | A1 | 12/2017 | Babaei et al. | |
| 2018/0152851 | A1* | 5/2018 | Li | H04L 41/0681 |
| 2018/0213560 | A1* | 7/2018 | Naghshvar | H04W 74/0808 |
| 2018/0343646 | A1* | 11/2018 | Chou | H04W 16/14 |
| 2018/0343676 | A1 | 11/2018 | Yerramalli et al. | |
| 2018/0352573 | A1 | 12/2018 | Yang et al. | |
| 2019/0037509 | A1* | 1/2019 | Li | H04W 56/001 |
| 2019/0044616 | A1* | 2/2019 | Laski | G01S 3/782 |
| 2019/0082426 | A1* | 3/2019 | Liou | H04W 72/23 |
| 2019/0104416 | A1* | 4/2019 | Yerramalli | H04W 72/51 |
| 2019/0104546 | A1* | 4/2019 | Chendamarai Kannan | |
| | | | | H04W 16/14 |
| 2019/0141693 | A1* | 5/2019 | Guo | H04B 7/088 |
| 2019/0182685 | A1* | 6/2019 | Abouelseoud | H04B 17/30 |
| 2019/0223043 | A1* | 7/2019 | Geng | H04L 5/0051 |
| 2019/0373635 | A1* | 12/2019 | Yang | H04B 7/0408 |
| 2019/0375503 | A1* | 12/2019 | Maxwell | G07C 5/008 |
| 2020/0037169 | A1* | 1/2020 | Chendamarai Kannan | |
| | | | | H04L 5/0055 |
| 2020/0037354 | A1* | 1/2020 | Li | H04W 74/0808 |
| 2020/0052803 | A1* | 2/2020 | Deenoo | H04W 48/12 |
| 2020/0053599 | A1* | 2/2020 | Damnjanovic | H04L 27/0006 |
| 2020/0053781 | A1* | 2/2020 | Pan | H04J 11/0069 |
| 2020/0314906 | A1 | 10/2020 | Goyal et al. | |
| 2020/0404660 | A1* | 12/2020 | Joseph | H04W 72/23 |
| 2021/0058967 | A1* | 2/2021 | Oteri | H04W 72/23 |
| 2021/0160922 | A1* | 5/2021 | Luo | H04L 5/0053 |
| 2021/0235340 | A1* | 7/2021 | Moosavi | H04W 36/0094 |
| 2021/0251004 | A1* | 8/2021 | Chendamarai Kannan | |
| | | | | H04W 24/08 |
| 2022/0030623 | A1* | 1/2022 | Wang | H04W 74/0808 |

FOREIGN PATENT DOCUMENTS

| | | |
|---|---|---|
| WO | WO-2014/002533 A1 | 1/2014 |
| WO | WO-2019/079500 A1 | 4/2019 |
| WO | WO-2020/125121 A1 | 6/2020 |

OTHER PUBLICATIONS

International Search Report and Written Opinion for PCT Appl. No. PCT/CN2020/120946, mailed Jul. 14, 2021 (6 pages).

Extended European Search Report for EP Appl. No. 20957064.7, dated Sep. 13, 2023 (9 pages).

Lagen, S. et al., "LBT Switching Procedures for New Radio-based Access to Unlicensed Spectrum", 2018 IEEE Globecom Workshops (GC Wkshps), IEEE, Dec. 9, 2018, 6 pages.

International Search Report with English translation and Written Opinion for International Application No. PCT/CN2021/120946, mailed Jul. 14, 2021 (6 pages).

R1-1810126 RAN Meeting, 3GPP TSG RAN WG1 Meeting #94bis. Oct. 12, 2018. Coexistence and channel access for NR unlicensed band operations.

Notice of Grounds of Rejection for JP Appl. No. 2022-552258, dated Jul. 16, 2024 (with English translation, 10 pages).

\* cited by examiner

100 switching, by a wireless communication node, from a first uplink LBT scheme to a second uplink LBT scheme in response to a congestion level of an uplink channel between the wireless communication node and a network device or in response to a first or second downlink signal including LBT scheme switching information transmitted from the network device 110

FIG. 1 transmitting, by a network device to a wireless communication node, a first or second downlink signal comprising LBT scheme switching information to make the wireless communication node switch from a first uplink LBT scheme to a second uplink LBT scheme 210

200

FIG. 2 switching, by a network device, from a first downlink LBT scheme to a second downlink LBT scheme in response to a congestion level of a downlink channel between the network device and a wireless communication node, or in response to one or more trigger events corresponding to a congestion level within a service range corresponding to the network device 310

METHOD, DEVICE AND COMPUTER PROGRAM PRODUCT FOR WIRELESS COMMUNICATION

CROSS-REFERENCE TO RELATED APPLICATION

This application claims the benefit of priority under 35 U.S.C. § 120 as a continuation of PCT Patent Application No. PCT/CN2020120946, filed on Oct. 14, 2020, the disclosure of which is incorporated herein by reference in its entirety.

TECHNICAL FIELD

The present disclosure is generally directed to wireless communication. In particular, the present disclosure is directed to a method, device, and computer program product for wireless communication. In particular, the present disclosure relates to 5G wireless communication.

SUMMARY

With the development of 5G new radio (NR) networks, there will be an explosion of new user data applications. With such a rapid growth of user data, the demand for a broad frequency spectrum will increase dramatically. In order to alleviate the requirement of the spectrum, equipment manufacturers and operators all over the world focus on resource-rich, free and unlicensed spectrum.

In a low frequency NR unlicensed band, e.g., 5 GHz, it is mandated for user equipments (UE) and/or base stations (BS) to perform a Listen Before Talk (LBT) operation before transmissions. The only LBT scheme allowed in a low frequency unlicensed band is an omnidirectional LBT scheme. Besides, the signal transmission direction is also omnidirectional due to the relatively long wavelength.

In the 3rd Generation Partnership Project (3GPP) plenary meeting, RAN #86, a new study item (SI) was approved for studies supporting NR from 52.6 GHz to 71 GHz. For transmission at a high frequency bandwidth, massive antenna elements for beam-forming are needed to combat high propagation loss. Under this situation, using an omnidirectional LBT scheme may be unnecessary and may not match the directional transmission in high frequency communication, and that is why directional LBT scheme is introduced. However, in some cases, the omnidirectional LBT scheme is also used in high frequency transmission, so that the NR system may still need the omnidirectional LBT scheme. In addition, No LBT scheme, which means talk/ transmission without listening before, is also being widely discussed in 3GPP RAN1 meeting because the interference may be limited with the directional transmission after beam-forming.

The present disclosure relates to methods, devices, and computer program products for wireless communication, which can allow a wireless communication node or a network device operably change its LBT scheme according to actual situations, so that the configurations can be more flexible.

One aspect of the present disclosure relates to a wireless communication method. In an embodiment, the wireless communication method includes: switching, by a wireless communication node, from a first uplink Listen Before Talk, LBT, scheme to a second uplink LBT scheme in response to a congestion level of an uplink channel between the wireless communication node and a network device or in response to a first or second downlink signal including LBT scheme switching information transmitted from the network device.

Another aspect of the present disclosure relates to a wireless communication method. In an embodiment, the wireless communication method includes: transmitting, by a network device to a wireless communication node, a first or second downlink signal including Listen Before Talk, LBT, scheme switching information to make the wireless communication node switch from a first uplink LBT scheme to a second uplink LBT scheme. The first downlink signal is transmitted in response to a congestion level of an uplink channel between the wireless communication node and the network device, and the second downlink signal is transmitted in response to one or more trigger events corresponding to a congestion level within a service range corresponding to the network device.

Another aspect of the present disclosure relates to a wireless communication method. In an embodiment, the wireless communication method includes: switching, by a network device, from a first downlink Listen Before Talk. LBT, scheme to a second downlink LBT scheme in response to a congestion level of a downlink channel between the network device and a wireless communication node, or in response to one or more trigger events corresponding to a congestion level within a service range corresponding to the network device Another aspect of the present disclosure relates to a wireless communication node. In an embodiment, the wireless communication node includes a communication unit and a processor. The processor is configured to switch from a first uplink Listen Before Talk, LBT, scheme to a second uplink LBT scheme in response to a congestion level of an uplink channel between the wireless communication node and the network device or in response to a first or second downlink signal including LBT scheme switching information transmitted from the network device.

Another aspect of the present disclosure relates to a network device. In an embodiment, the network device includes a communication unit and a processor. The processor is configured to transmit, through the communication unit, a first or second downlink signal including Listen Before Talk. LBT, scheme switching information to make the wireless communication node switch from a first uplink LBT scheme to a second uplink LBT scheme.

Another aspect of the present disclosure relates to a network device. In an embodiment, the network device includes a communication unit and a processor. The processor is configured to switch from a first downlink Listen Before Talk, LBT, scheme to a second downlink LBT scheme in response to a congestion level of a downlink channel between the network device and the wireless communication node, or in response to one or more trigger events corresponding to a congestion level within a service range corresponding to the network device.

Various embodiments may preferably implement the features below.

Preferably, the congestion level of the uplink channel is determined according to whether one or more uplink transmissions are successfully detected by the network device.

Preferably, the congestion level of the uplink channel corresponds to at least one of an amount of NACK signals received by the wireless communication node, a NACK probability corresponding to the uplink channel, a no-feedback-time corresponding to the uplink channel, a number of times of re-transmissions performed by the wireless communication node, a re-transmission probability corresponding to the uplink channel, an amount of ACK signals received by the wireless communication node, or an ACK probability corresponding to the uplink channel.

Preferably, the congestion level is determined corresponding to a radio quality.

Preferably, the radio quality corresponds to a signal strength.

Preferably, the radio quality corresponds to a signal to noise ratio or a reference signal received power.

Preferably, the first uplink LBT scheme and the second uplink LBT scheme are two of a No LBT scheme, an omnidirectional LBT scheme, or a directional LBT scheme.

Preferably, the wireless communication node switches from a No LBT scheme to an omnidirectional LBT scheme or a directional LBT scheme, or from the directional LBT scheme to the omnidirectional LBT scheme, in response to a signal to noise ratio or a reference signal received power is greater than or equal to a first threshold, and at least one of the following conditions;
- an amount of NACK signals received by the wireless communication node is greater than or equal to a second threshold,
- a NACK probability corresponding to the uplink channel is greater than or equal to a third threshold,
- a no-feedback-time corresponding to the uplink channel is greater than or equal to a fourth threshold,
- a number of times of re-transmissions performed by the wireless communication node is greater than or equal to a fifth threshold,
- a re-transmission probability corresponding to the uplink channel is greater than or equal to a sixth threshold,
- an amount of ACK signals received by the wireless communication node is less than a seventh threshold, or
- an ACK probability corresponding to the uplink channel is less than an eighth threshold.

Preferably, the wireless communication node switches from an omnidirectional LBT scheme to a No LBT scheme or a directional LBT scheme, or from the directional LBT scheme to the No LBT scheme, in response to at least one of the following conditions:
- an amount of NACK signals received by the wireless communication node is less than a ninth threshold,
- a NACK probability corresponding to the uplink channel is less than a tenth threshold,
- a number of times of re-transmissions performed by the wireless communication node is less than an eleventh threshold,
- a re-transmission probability corresponding to the uplink channel is less than a twelfth threshold
- an amount of ACK signals received by the wireless communication node is greater than or equal to a thirteenth threshold, or
- an ACK probability corresponding to the uplink channel is greater than or equal to a fourteenth threshold.

Preferably, the first downlink signal is a user equipment specific Downlink Control Information signal, or a Medium Access Control Control Element, MAC CE.

Preferably, the second downlink signal is a common Downlink Control Information signal, a broadcast system information message, or a Radio Resource Control message.

Preferably, the wireless communication method further includes transmitting, by the wireless communication node to the network device, feedback information corresponding to a congestion level of a downlink channel, to make the network device switch from a first downlink LBT scheme to a second downlink LBT according to the feedback information.

Preferably, the wireless communication method further includes transmitting, by the network device to the wireless communication node, feedback information corresponding to the congestion level of the uplink channel, to make the wireless communication node operably switch from the first uplink LBT scheme to the second uplink LBT scheme according to the feedback information.

Preferably, the network device transmits the first downlink signal including a piece of a first type of LBT scheme switching information to make the wireless communication node switch from the first uplink LBT scheme to the second uplink LBT scheme in response to a signal to noise ratio or a reference signal received power is greater than or equal to a first threshold, and at least one of the following conditions:
- a number of times of failed detections of uplink transmissions is greater than or equal to a second threshold,
- a probability of failed detections of uplink transmissions is greater than or equal to a third threshold,
- a number of times of successful detections of uplink transmissions is less than a fourth threshold, or
- a probability of successful detections of uplink transmissions is less than a filth threshold.

Preferably, the network device transmits the first downlink signal including the piece of the first type of LBT scheme switching information in response to the first uplink LBT scheme of the wireless communication node being a No LBT scheme or a directional LBT scheme.

Preferably, the network device transmits the first downlink signal including a piece of a second type of LBT scheme switching information to make the wireless communication node switch from the first uplink LBT scheme to the second uplink LBT scheme in response to at least one of the following conditions:
- a number of times of failed detections of uplink transmissions is less than a sixth threshold,
- a probability of failed detections of uplink transmissions is less than a seventh threshold,
- a number of times of successful detections of uplink transmissions is greater than or equal to an eighth threshold, or
- a probability of successful detections of uplink transmissions is greater than or equal to a ninth threshold.

Preferably, the network device transmits the first downlink signal including the piece of the second type of LBT scheme switching information in response to the first uplink LBT scheme of the wireless communication node being a directional LBT scheme or an omnidirectional LBT scheme.

Preferably, the one or more trigger events include at least one of the following: whether another wireless system exists in the service range, a number of nodes accessing the network device, or an overall probability of decoding error of the network device.

Preferably, the network device transmits the second downlink signal including a piece of a first type of LBT scheme switching information to make the wireless communication node switch from the first uplink LBT scheme to the second uplink LBT scheme in response to at least one of the following conditions:
- another wireless system exists in the service range,
- a number of nodes accessing the network device is greater than or equal to a tenth threshold, or
- an overall probability of decoding error of the network device is greater than or equal to an eleventh threshold.

Preferably, the network device transmits the second downlink signal including a piece of a second type of LBT scheme switching information to make the wireless communication node switch from the first uplink LBT scheme to the second uplink LBT scheme in response to at least one of the following conditions:

no other wireless system exists in the service range, a number of nodes accessing the network device is less than a twelfth threshold, or an overall probability of decoding error of the network device is less than a thirteenth threshold.

Preferably, the network device transmits the second downlink signal including the piece of the second type of LBT scheme switching information in response to the first uplink LBT scheme of the wireless communication node being a directional LBT scheme or an omnidirectional LBT scheme.

Preferably, the congestion level of the downlink channel is determined according to whether one or more downlink transmissions are successfully detected by the wireless communication node.

Preferably, the congestion level of the downlink channel corresponds to at least one of an amount of NACK signals corresponding to the downlink channel, a NACK probability corresponding to the downlink channel, a no-feedback-time corresponding to the downlink channel, a number of times of re-transmissions corresponding to the downlink channel, a re-transmission probability corresponding to the downlink channel, an amount of ACK signals received by the wireless communication node, or an ACK probability corresponding to the uplink channel.

Preferably, the first downlink LBT scheme and the second downlink LBT scheme are two of a No LBT scheme, an omnidirectional LBT scheme, or a directional LBT scheme.

Preferably, the network device switches from a No LBT scheme to an omnidirectional LBT scheme or a directional LRT scheme, or from the directional LBT scheme to the omnidirectional LBT scheme, in response to a signal to noise ratio or a reference signal received power is greater than or equal to a first threshold, and at least one of the following conditions:

an amount of NACK signals corresponding to the downlink channel is greater than or equal to a second threshold, a NACK probability corresponding to the downlink channel is greater than or equal to a third threshold, a no-feedback-time corresponding to the downlink channel is greater than or equal to a fourth threshold, a number of times of re-transmissions corresponding to the downlink channel is greater than or equal to a fifth threshold.

a re-transmission probability corresponding to the downlink channel is greater than or equal to a sixth threshold, an amount of ACK signals received by the wireless communication node is less than a seventh threshold, or an ACK probability corresponding to the uplink channel is less than an eighth threshold.

Preferably, the wireless communication node switches from an omnidirectional LBT scheme to a No LBT scheme or a directional LBT scheme, or from the directional LBT scheme to the No LBT scheme, in response to at least one of the following conditions:

an amount of NACK signals corresponding to the downlink channel is less than a ninth threshold, a NACK probability corresponding to the downlink channel is less than a tenth threshold, a number of times of re-transmissions corresponding to the downlink channel is less than an eleventh threshold, a re-transmission probability corresponding to the downlink channel is less than a twelfth threshold an amount of ACK signals received by the wireless communication node is greater than or equal to a thirteenth threshold, or an ACK probability corresponding to the uplink channel is greater than or equal to a fourteenth threshold.

Preferably, the network device switches from a No LBT scheme to an omnidirectional LBT scheme or a directional LBT scheme, or from the directional LBT scheme to the omnidirectional LBT scheme, in response to at least one of the following conditions:

another wireless system exists in the service range, a number of nodes accessing the network device is greater than or equal to a fifteenth threshold, or an overall probability of decoding error of the network device is greater than or equal to a sixteenth threshold.

Preferably, the network device switches from an omnidirectional LBT scheme to a No LBT scheme or a directional LBT scheme, or from the directional LBT scheme to the No LBT scheme, in response to at least one of the following conditions:

no other wireless system exists in the service range, a number of nodes accessing the network device is less than a seventeenth threshold, or an overall probability of decoding error of the network device is less than an eighteenth threshold.

Preferably, the wireless communication method further including transmitting, by the network device to the wireless communication node, feedback information corresponding to a congestion level of an uplink channel, to make the wireless communication node operatively switch from a first uplink LBT scheme to a second uplink LBT scheme according to the feedback information.

The present disclosure also relates to a computer program product including a computer-readable program medium code stored thereupon, the code, when executed by a processor, causing the processor to implement a wireless communication method recited in any of foregoing methods.

BRIEF DESCRIPTION OF THE DRAWINGS

FIG. 1 illustrates a wireless communication method according to an embodiment of the present disclosure:

FIG. 2 illustrates another wireless communication method according to an embodiment of the present disclosure;

FIG. 3 illustrates still another wireless communication method according to an embodiment of the present disclosure;

DETAILED DESCRIPTION

Figure 4:
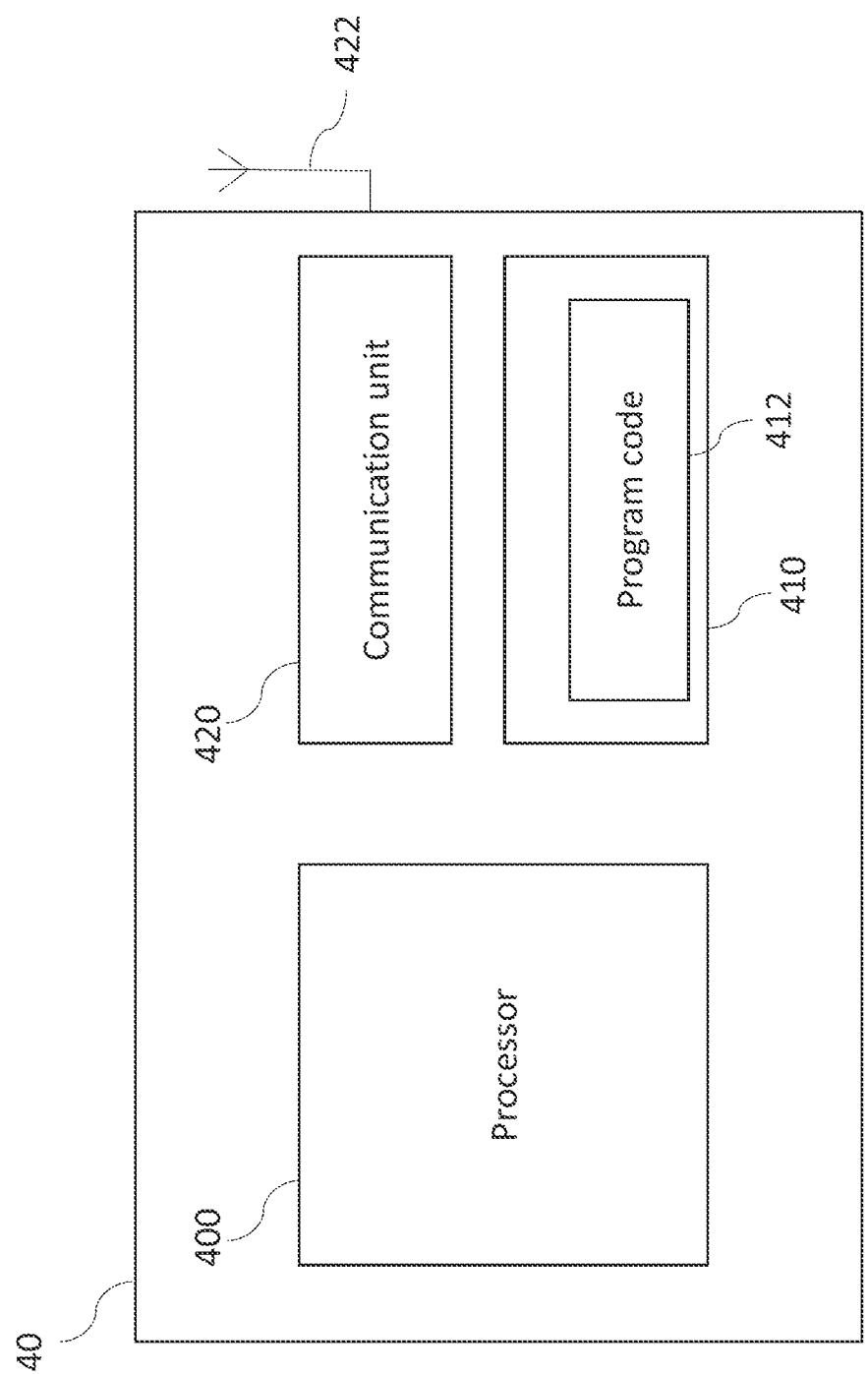
FIG. 4 shows a schematic diagram of a wireless communication node according to an embodiment of the present disclosure.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

One aspect of the present disclosure is related to a wireless communication method corresponding to multiple LBT schemes. Different LBT schemes would affect the congestion level of corresponding channel differently. For example, if No LBT scheme is configured, the congestion level of the corresponding channel would be the heavy because the transmissions are allowed without listening. Accordingly, in some embodiments of the present disclosure, different LBT schemes can be adopted corresponding to the congestion level of the corresponding channel.

FIG. 1 illustrates a wireless communication method 100 according to an embodiment of the present disclosure. In an embodiment, the wireless communication method 100 can be performed by using a wireless communication node. In the paragraph below, a wireless communication node, such as a UE, will be used in a descriptive example, but the present disclosure is not limited in this regard. Details of the wireless communication node can be ascertained by referring to the paragraphs related to FIG. 4 below.

In an embodiment, the wireless communication method 100 includes operation 110.

In operation 110, the wireless communication node switches from a first uplink Listen Before Talk (LBT) scheme to a second uplink LBT scheme in response to a congestion level of an uplink channel between the wireless communication node and a network device or in response to a first or second downlink signal including LBT scheme switching information transmitted from the network device.

Through such a method, the wireless communication node can operably change its LBT scheme, so that the configuration of the wireless communication node can be more flexible. Besides, through some embodiments of the method, when there are multiple wireless communication nodes in a service range (e.g., a cell) of a network device (e.g., base station), the method above allows multiple LBT schemes to co-exist. Furthermore, through some embodiments of the method, congestion in the service range due to inappropriate LBT scheme configuration(s) can be avoided.

In an embodiment of the present disclosure, the method 100 further includes receiving, by the wireless communication node from the network device, feedback information corresponding to the congestion level of the uplink channel, to make the wireless communication node operatively switch from the first uplink LBT scheme to the second uplink LBT scheme according to the feedback information. In an embodiment, the feedback information includes hybrid automatic repeat request-acknowledgement (HARQ-ACK) information, but is not limited to this.

In an embodiment of the present disclosure, the first downlink signal is transmitted by the network device in response to the congestion level of the uplink channel between the wireless communication node and the network device. In an embodiment, the first downlink signal is a device-specific signal. That is, only said wireless communication node in a service range corresponding to the network device can receive the first downlink signal.

In an embodiment of the present disclosure, the second downlink signal is transmitted by the network device in response to one or more trigger events corresponding to a congestion level within a service range (e.g., a cell) corresponding to the network device. In an embodiment, the first downlink signal is a common signal. That is, all wireless communication nodes in a service range corresponding to the network device can receive the second downlink signal.

In an embodiment of the present disclosure, the first uplink LBT scheme and the second uplink LBT scheme are two of a No LBT scheme, an omnidirectional LBT scheme, or a directional LBT scheme, but are not limited thereto.

Details of the method 100 would be described in Embodiments 1-12 (particularly in Embodiments 1-3 and 7-9) below.

FIG. 2 illustrates a wireless communication method 200 according to an embodiment of the present disclosure. In an embodiment, the wireless communication method 200 can be performed by using a network device. In the paragraph below, a network device, such as a BS, will be used in a descriptive example, but the present disclosure is not limited in this regard. Details of the network device can be ascertained by referring to the paragraphs related to FIG. 5 below.

In an embodiment, the wireless communication method 200 includes operation 210.

In operation 210, the network device transmits a first or second downlink signal including LBT scheme switching information to a wireless communication node to make the wireless communication node switch from a first uplink LBT scheme to a second uplink LBT scheme. In an embodiment, the first downlink signal is transmitted in response to a congestion level of an uplink channel between the wireless communication node and the network device. In an embodiment, the second downlink signal is transmitted in response to one or more trigger events corresponding to a congestion level within a service range corresponding to the network device.

Through such a method, the network device can make the wireless communication node operably change its LBT scheme, so that the configuration of the wireless communication node can be more flexible. Besides, through some embodiments of the method, when there are multiple wireless communication nodes in the service range of the network device, the method above allows multiple LBT schemes co-exist. Furthermore, through some embodiments of the method, congestion in the service range due to inappropriate LBT scheme configuration(s) can be avoided.

In some embodiments, the first and second downlink signals in the method 200 can have the same characteristic as the first and second downlink signals in the method 100, but are not limited thereto.

Details of the method 200 would be described in Embodiments 1-12 (particularly in Embodiments 1-3 and 7-9) below.

FIG. 3 illustrates a wireless communication method 300 according to an embodiment of the present disclosure. In an embodiment, the wireless communication method 300 can be performed by using a network device. In the paragraph below, a network device, such as a BS, will be used in a descriptive example, but the present disclosure is not limited in this regard. Details of the network device can be ascertained by referring to the paragraphs related to FIG. 5 below.

In an embodiment, the wireless communication method 300 includes operation 310.

In operation 310, the network device switches from a first downlink LBT scheme to a second downlink LBT scheme in response to a congestion level of a downlink channel between the network device and a wireless communication node, or in response to one or more trigger events corresponding to a congestion level within a service range corresponding to the network device.

Through such a method, the network device can change its LBT scheme, so that the configuration of the LBT scheme of the network device can be more flexible. Besides, through some embodiments of the method, congestion in the service range due to inappropriate LBT scheme configuration(s) can be avoided.

In an embodiment of the present disclosure, the method 300 further includes receiving, by the network device from the wireless communication node, feedback information corresponding to the congestion level of the downlink channel, to make the network device switch from the first downlink LBT scheme to the second downlink LBT according to the feedback information. In an embodiment, the feedback information includes HARQ-ACK information, but is not limited to this. In an embodiment, the feedback information corresponds to whether one or more downlink transmissions are successfully detected decoded.

In an embodiment of the present disclosure, the first downlink LBT scheme and the second downlink LBT scheme are two of a No LBT scheme, an omnidirectional LBT scheme, or a directional LBT scheme, but are not limited thereto.

Details of the method 300 would be described in Embodiments 1-12 (particularly in Embodiments 4-6 and 10-12) below.

In the following paragraphs, Embodiments 1-12 are described to provide details of the present disclosure, but the present disclosure is not limited to these embodiments.

To facilitate reading, types of LBT scheme switching of Embodiments 1-12 are organized in the table below.

| LBT scheme switching | uplink LBT scheme switching | downlink LBT scheme switching |
|---|---|---|
| No LBT scheme to directional LBT scheme | Embodiment 1 | Embodiment 4 |
| No LBT scheme to omnidirectional LBT scheme | Embodiment 2 | Embodiment 5 |
| directional LBT scheme to omnidirectional LBT scheme | Embodiment 3 | Embodiment |
| directional LBT scheme to No directional LBT scheme | Embodiment 7 | Embodiment 10 |
| omnidirectional LBT scheme to No directional LBT scheme | Embodiment 8 | Embodiment 11 |
| omnidirectional scheme LBT to directional LBT scheme | Embodiment 9 | Embodiment 12 |

Embodiment 1

In Embodiment 1, a wireless communication node switches from the No LBT scheme to the directional LBT scheme. In some embodiments, there are three approaches for the LBT switching.

Embodiment 1—Approach 1

In an embodiment, the wireless communication node switches from the No LBT scheme to the directional LBT scheme in response to a congestion level of an uplink channel between the wireless communication node and a network device. In this embodiment, the wireless communication node determines the congestion level of the uplink channel according to a transmission quality corresponding to the uplink channel, such as whether one or more uplink transmissions are successfully detected (or decoded) by the network device.

In an embodiment, the wireless communication node measures the transmission quality according to feedback information from the network device. In an embodiment, the feedback information may include HARQ-ACK information. In an embodiment, the feedback information corresponds to whether one or more uplink transmissions are successfully detected/decoded.

In an embodiment, the wireless communication node determines the congestion level corresponding to at least one of an amount of NACK signals received by the wireless communication node, a NACK probability corresponding to the uplink channel, a no-feedback-time corresponding to the uplink channel, a number of times of re-transmissions performed by the wireless communication node, a re-transmission probability corresponding to the uplink channel, an amount of ACK signals received by the wireless communication node, and/or an ACK probability corresponding to the uplink channel.

In an embodiment, the amount of NACK signals received by the wireless communication node can be the amount of NACK signals received by the wireless communication node corresponding to the uplink channel within a configured time or in an unlimited time period. In an embodiment, the amount of NACK signals described here can be the amount of NACK signals in one HARQ process or the accumulated amount of NACK signals in multiple HARQ processes.

In an embodiment, the NACK probability corresponding to the uplink channel can be determined according to the amounts of NACK and ACK signals received by the wireless communication node corresponding to the uplink channel within a configured time (can be the same as or different from the configured time mentioned above) or in an unlimited time period. In an embodiment, the NACK probability can be calculated by dividing the amount of NACK signal by a summation of the amount of NACK signals and the amount of ACK signals.

In an embodiment, the no-feedback-time corresponding to the uplink channel can be the time the wireless communication node not receiving feedback information from the network device after a transmission via the uplink channel. By using the no-feedback-time for determination of the congestion level, it can be avoided that the wireless communication node is not able to receive the NACK signals/messages due to any unexpected reason (e.g., downlink LBT failure).

In an embodiment, the number of times of re-transmissions performed by the wireless communication node can be the number of times of re-transmissions performed by the wireless communication node corresponding to the uplink channel within a configured time (can be the same as or different from anyone of the configured time mentioned above) or in an unlimited time period. In an embodiment, the number of times of re-transmissions described here can be the number of times of re-transmissions in one HARQ process or the accumulated number of times of re-transmissions in multiple HARQ processes.

In an embodiment, the re-transmission probability corresponding to the uplink channel can be determined according to the numbers of times of re-transmissions or new-transmissions performed by the wireless communication node corresponding to the uplink channel within a configured time (can be the same as or different from anyone of the configured time mentioned above) or in an unlimited time period. In some embodiments, the new-transmissions performed by the wireless communication node correspond to a feedback from the network device indicating that the previous uplink transmission is decoded successfully, while the re-transmissions performed by the wireless communication node correspond to another feedback from the network device indicating that the previous uplink transmission is decoded unsuccessfully. In an embodiment, the re-transmission probability can be calculated by dividing the number of times of re-transmissions by a summation of the number of times of re-transmissions and the number of times of new-transmissions.

In an embodiment, the amount of ACK signals received by the wireless communication node can be the amount of ACK signals received by the wireless communication node corresponding to the uplink channel within a configured time (can be the same as or different from anyone of the configured time mentioned above) or in an unlimited time period. In an embodiment, the amount of ACK signals described here can be the amount of ACK signals in one HARQ process or the accumulated amount of ACK signals in multiple HARQ processes.

In an embodiment, the ACK probability corresponding to the uplink channel can be determined according to the amounts of NACK and ACK signals received by the wireless communication node corresponding to the uplink channel within a configured time (can be the same as or different from anyone of the configured time mentioned above) or in an unlimited time period. In an embodiment, the ACK probability can be calculated by dividing the amount of NACK signal by a summation of the amount of NACK signals and the amount of ACK signals.

In some embodiments, the wireless communication node determines the congestion level of the uplink channel corresponding to a radio quality. In an embodiment, the radio quality corresponds to the uplink channel. In an embodiment, the radio quality corresponds to a signal strength. In an embodiment, the radio quality corresponds to a signal to noise ratio (SNR) or a reference signal received power (RSRP).

In an embodiment, the wireless communication node determines the congestion level according to both the radio quality and the transmission quality. For example, the wireless communication node may determine the congestion level is relatively high in response to the transmission quality is weaker than a certain criteria (e.g., many uplink transmissions cannot be successfully detected by the network device) and the radio quality is greater than another certain criteria. In this manner, it can avoid the wireless communication node incorrectly determines the congestion level is relatively high due to the radio quality is bad.

In an embodiment, the wireless communication node determines the congestion level is relatively high and switches from the No LBT scheme to the directional LBT scheme in response to the SNR or the RSRP described above is greater than or equal to a threshold s1_1, and at least one of the following conditions:

the amount of NACK signals received by the wireless communication node is to greater than or equal to a threshold n_1, the NACK probability corresponding to the uplink channel is greater than or equal to a threshold p_1, the no-feedback-time corresponding to the uplink channel is greater than or equal to a threshold tf_1, the number of times of re-transmissions performed by the wireless communication node is greater than or equal to a threshold m_1;

the re-transmission probability corresponding to the uplink channel is greater than or equal to a threshold q_1, the amount of ACK signals received by the wireless communication node is less than a threshold x_1, or the ACK probability corresponding to the uplink channel is less than a threshold y_1.

In an embodiment, one or more of the thresholds s1_1, n_1, p_1, tf_1, m_1, q_1, x_1, y_1 can be predetermined or configured by another device. For example, these thresholds may be configured by using broadcast SI message, RRC message, or another feasible message from the network device.

From the perspective of the network device, in an embodiment, the network device transmits the feedback information to the wireless communication node, to allow the wireless communication node to determine the congestion level of the uplink channel and operably switch from the No LBT scheme to the directional LBT scheme in response to the feedback information. In an embodiment, the feedback information may include HARQ-ACK information. In an embodiment, the feedback information corresponds to whether one or more uplink transmissions ae successfully detected decoded.

Embodiment 1—Approach 2

In an embodiment, the wireless communication node switches from the No LBT scheme to the directional LBT scheme in response to a first downlink signal including LBT scheme switching information transmitted from a network device. In this embodiment, the first downlink signal is a device-specific signal. That is, only said wireless communication node in a service range corresponding to the network device can receive the first downlink signal. For example, the first downlink signal is a user equipment specific Downlink Control Information (UE specific DCI) signal, or a Medium Access Control Control Element (MAC CE).

From the perspective of the network device, in an embodiment, the network device transmits the first downlink signal including the LBT scheme switching information to the wireless communication node to make the wireless communication node switch from the No LBT scheme to the directional LBT scheme.

In an embodiment, the first downlink signal is transmitted in response to the congestion level of the uplink channel between the wireless communication node and the network device. In this embodiment, the network device determines the congestion level of the uplink channel according to a transmission quality corresponding to the uplink channel, such as whether one or more uplink transmissions are successfully detected (or decoded) by the network device.

In an embodiment, the network device determines the congestion level corresponding to at least one of a number of times of failed detections of uplink transmissions, a probability of failed detections of uplink transmissions, a number of times of successful detections of uplink transmissions, and/or a probability of successful detections of uplink transmissions.

In an embodiment, the number of times of failed detections of uplink transmissions can be the number of times of failed detections of uplink transmissions performed by the network device corresponding to the uplink channel within a configured time (can be the same as or different from anyone of the configured times mentioned above) or in an unlimited time period.

In an embodiment, the probability of failed detections of uplink transmissions can be determined according to the number of times of failed detections of uplink transmissions performed by the network device corresponding to the uplink channel within a configured time (can be the same as or different from anyone of the configured time mentioned above) or in an unlimited time period and the number of total uplink transmissions received by the network device corresponding to the uplink channel within the configured or in the unlimited time period. In an embodiment the probability of failed detections of uplink transmissions can be calculated by dividing the umber of times of failed detections of uplink transmissions by the number of total uplink transmissions.

In an embodiment, the number of times of successful detections of uplink transmissions can be the number of times of successful detections of uplink transmissions performed by the network device corresponding to the uplink channel within a configured time (can be the same as or different from anyone of the configured times mentioned above) or in an unlimited time period.

In an embodiment, the probability of successful detections of uplink transmissions can be determined according to the number of times of successful detections of uplink transmissions performed by the network device corresponding to the uplink channel within a configured time (can be the same as or different from anyone of the configured time mentioned above) or in an unlimited time period and the number of total uplink transmissions received by the network device corresponding to the uplink channel within the configured or in the unlimited time period. In an embodiment the probability of successful detections of uplink transmissions can be calculated by dividing the number of times of successful detections of uplink transmissions by the number of total uplink transmissions.

In an embodiment, the network device determines the congestion level according to both the radio quality and the transmission quality. For example, the network device may determine the congestion level is relatively high in response to the transmission quality is weaker than a certain criteria (e.g., many uplink transmissions cannot be successfully detected by the wireless communication node) and the radio quality is greater than another certain criteria. In this manner, it can avoid the network device incorrectly determines the congestion level is relatively high due to the radio quality is bad.

In an embodiment, the network device determines the congestion level is relatively high and transmits the first downlink signal including a piece of a first type of LBT scheme switching information to make the wireless communication node switch from the No LBT scheme to the directional LBT scheme in response to the SNR or the RSRP described above is greater than or equal to a threshold $s2\_1$, and at least one of the following conditions:

the number of times of failed detections of uplink transmissions is greater than or equal to a threshold $a\_1$.

the probability of failed detections of uplink transmissions is greater than or equal to a threshold $b\_1$, the number of times of successful detections of uplink transmissions is less than a threshold $e\_1$, or the probability of successful detections of uplink transmissions is less than a threshold $f\_1$.

In an embodiment, one or more of the thresholds $s2\_1$, $a\_1$, $b\_1$, $e\_1$, $d\_1$ can be predetermined or configured by another device. In an embodiment, the threshold $s2\_1$ can be equal to or different from the threshold $s1\_1$ described above.

In an embodiment, the first downlink signal including the first type of LBT scheme switching information is used to make the wireless communication node switch from an LBT scheme corresponding to a relatively high congestion level to an LBT scheme corresponding to a relatively low congestion level, such as from the No LBT scheme to the directional LBT scheme or the omnidirectional LBT scheme, or from the directional LBT scheme to the omnidirectional LBT scheme.

In an embodiment, the network device transmits the first downlink signal including the piece of the first type of LBT scheme switching information in response to the wireless communication node being in the No LBT scheme or the directional LBT scheme. That is, if the wireless communication node is in the omnidirectional LBT scheme, the network device may decide not to transmit the first downlink signal including the piece of the first type of LBT scheme switching information to the wireless communication node because it may not make any change.

Embodiment 1—Approach 3

In an embodiment, the wireless communication node switches from the No LBT scheme to the directional LBT scheme in response to a second downlink signal including LBT scheme switching information transmitted from a network device. In this embodiment, the second downlink signal is a common signal. That is, all wireless communication nodes in a service range corresponding to the network device can receive the second downlink signal. For example, the second downlink signal is a common Downlink Control Information (DCI) signal, a broadcast system information (St) message, or a Radio Resource Control (RRC) message.

From the perspective of the network device, in an embodiment, the network device transmits the second downlink signal including the LBT scheme switching information to the wireless communication node to make the wireless communication node switch from the No LBT scheme to the directional LBT scheme.

In an embodiment, the second downlink signal is transmitted in response to one or more trigger events corresponding to a congestion level within a service range corresponding to the network device (e.g., an overall congestion level in the service range). In an embodiment, the one or more trigger events include at least one of whether another wireless system (e.g., a Wifi system) existing in the service range, a number of nodes accessing the network device, and/or an overall probability of decoding error (or detection error) of the network device.

In an embodiment, the overall probability of decoding error can be determined according to the numbers of decoding errors and total transmissions within a configured time (can be the same as or different from anyone of the configured time mentioned above) or in an unlimited time period. In an embodiment the overall probability of decoding error can be calculated by dividing the number of decoding errors by the number of total transmissions.

In an embodiment, the network device determines the overall congestion level in the service range is relatively high and transmits the second downlink signal including a piece of a first type of LBT scheme switching information to wake the wireless communication node switch from the No LBT scheme to the directional LBT scheme in response to at least one of the following conditions:
- another wireless system exists in the service range,
- a number of nodes accessing the network device is greater than or equal to a threshold $c\_1$, or
- an overall probability of decoding error of the network device is greater than or equal to a threshold $d\_1$.

In an embodiment, the second downlink signal including the first type of LBT scheme switching information is used to make the wireless communication node switch from an LBT scheme corresponding to a relatively high congestion level to an LBT scheme corresponding to a relatively low congestion level, such as from the No LBT scheme to the directional LBT scheme or the omnidirectional LBT scheme, or from the directional LBT scheme to the omnidirectional LBT scheme.

In an embodiment, the network device transmits the second downlink signal including the piece of the first type of LBT scheme switching information in response to the wireless communication node being in the No LBT scheme or the directional LBT scheme. That is, if the wireless communication node is in the omnidirectional LBT scheme, the network device may decide not to transmit the second downlink signal including the piece of the first type of LBT scheme switching information to the wireless communication node because it may not make any change.

Embodiment 2

In Embodiment 2, a wireless communication node switches from the No LBT scheme to the omnidirectional LBT scheme. In some embodiments, there are three approaches for the LBT switching.

Embodiment 2—Approach 1

In an embodiment of this approach, the wireless communication node switches from the No LBT scheme to the omnidirectional LBT scheme in response to a congestion level of an uplink channel between the wireless communication node and a network device. In this embodiment, the wireless communication node determines the congestion level of the uplink channel according to a transmission quality corresponding to the uplink channel, such as whether one or more uplink transmissions are successfully detected (or decoded) by the network device.

From the perspective of the network device. In an embodiment of this approach, the network device transmits the feedback information to the wireless communication node, to allow the wireless communication node to determine the congestion level of the uplink channel and operably switch from the No LBT scheme to the omnidirectional LBT scheme in response to the feedback information.

It should be noted that many aspects of Approach 1 in Embodiment 2 are similar to Approach 1 in Embodiment 1 described above, and can be ascertain by referring to the paragraphs above. Similar descriptions will not be repeated herein.

It should also be noted that, in some embodiments of Approach 1 in Embodiment 2, thresholds $s1\_2$, $n\_2$, $p\_2$, $tf\_2$, $m\_2$, $q\_\_2$, $x\_2$, $y\_2$ are used in a manner similar to the thresholds $s1\_1$, $n\_1$, $p\_1$, $tf\_1$, $m\_1$, $q\_1$, $x\_1$, $y\_1$ described above respectively. In some embodiments, the values of thresholds $s1\_2$, $n\_2$, $p\_2$, $tf\_2$, $m\_2$, $q\_2$, $x\_2$, $y\_2$ are equal to, different from, or partially different from the values of the thresholds $s1\_1$, $n\_1$, $p\_1$, $tf\_1$, $m\_1$, $q\_1$, $x\_1$, $y\_1$ respectively.

Embodiment 2—Approach 2

In an embodiment of this approach, the wireless communication node switches from the No LBT scheme to the omnidirectional LBT scheme in response to a first downlink signal including LBT scheme switching information transmitted from a network device.

From the perspective of the network device. In an embodiment of this approach, the network device transmits the first downlink signal including the LBT scheme switching information to the wireless communication node to make the wireless communication node switch from the No LBT scheme to the omnidirectional LBT scheme. In an embodiment, the first downlink signal is transmitted in response to the congestion level of the uplink channel between the wireless communication node and the network device. In this embodiment, the network device determines the congestion level of the uplink channel according to a transmission quality corresponding to the uplink channel, such as whether one or more uplink transmissions are successfully detected for decoded) by the network device.

It should be noted that, many aspects of Approach 2 in Embodiment 2 are similar to Approach 2 in Embodiment 1 described above, and can be ascertain by referring to the paragraphs above. Similar descriptions will not be repeated herein.

It should also be noted that, in some embodiments of Approach 2 in Embodiment 2, thresholds $s2\_2$, $a\_2$, $b\_2$, $e\_2$, $f\_2$ are used in a manner similar to the thresholds $s2\_1$, $a\_1$, $b\_1$, $e\_1$, $f\_1$ described above respectively. In some embodiments, the values of thresholds $s2\_2$, $a\_2$, $b\_2$, $e\_2$, $f\_2$ are equal to, different from, or partially different from the values of the thresholds $s2\_1$, $a\_1$, $b\_1$, $e\_1$, $f\_1$ respectively.

Embodiment 2—Approach 3

In an embodiment of this approach, the wireless communication node switches from the No LBT scheme to the omnidirectional LBT scheme in response to a second downlink signal including LBT scheme switching information transmitted from a network device.

From the perspective of the network device. In an embodiment of this approach, the network device transmits the second downlink signal including the LBT scheme switching information to the wireless communication node to make the wireless communication node switch from the No LBT scheme to the omnidirectional LBT scheme.

In an embodiment, the second downlink signal is transmitted in response to one or more trigger events corresponding to a congestion level within a service range corresponding to the network device (e.g., an overall congestion level in the service range).

It should be noted that, many aspects of Approach 3 in Embodiment 2 are similar to Approach 3 in Embodiment 1 described above, and can be ascertain by referring to the paragraphs above. Similar descriptions will not be repeated herein.

It should also be noted that, in some embodiments of Approach 3 in Embodiment 2, thresholds $c\_2$, $d\_2$ are used in a manner similar to the thresholds $c\_1$, $d\_1$ described above respectively, in some embodiments, the values of thresholds $c\_2$, $d\_2$ are equal to, different from, or partially different from the values of the thresholds $c\_1$, $d\_1$ respectively.

Embodiment 3

In Embodiment 3, a wireless communication node switches from the directional LBT scheme to the omnidirectional LBT scheme. In some embodiments, there are three approaches for the LBT switching.

Embodiment 3—Approach 1

In an embodiment of this approach, the wireless communication node switches from the directional LBT scheme to the omnidirectional LBT scheme in response to a congestion level of an uplink channel between the wireless communication node and a network device. In this embodiment, the wireless communication node determines the congestion level of the uplink channel according to a transmission quality corresponding to the uplink channel, such as whether one or more uplink transmissions are successfully detected (or decoded) by the network device.

From the perspective of the network device, in an embodiment of this approach, the network device transmits the feedback information to the wireless communication node, to allow the wireless communication node to determine the congestion level of the uplink channel and operably switch from the directional LBT scheme to the omnidirectional LBT scheme in response to the feedback information.

It should be noted that, many aspects of Approach 1 in Embodiment 3 are similar to Approach 1 in Embodiment 1 described above, and can be ascertain by referring to the paragraphs above. Similar descriptions will not be repeated herein.

It should also be noted that, in some embodiments of Approach 1 in Embodiment 3, thresholds $s1\_3$, $n\_3$, $p\_3$, $tf\_3$, $m\_3$, $q\_3$, $x\_3$, $y\_3$ are used in a manner similar to the thresholds $s1\_1$, $n\_1$, $p\_1$, $tf\_1$, $m\_1$, $q\_1$, $x\_1$, $y\_1$ described above respectively. In some embodiments, the values of thresholds $s1\_3$, $n\_3$, $p\_3$, $tf\_3$, $m\_3$, $q\_3$, $x\_3$, $y\_3$ are equal to, different from, or partially different from the values of the thresholds $s1\_1$, $n\_1$, $p\_1$, $tf\_1$, $m\_1$, $q\_1$, $x\_1$, $y\_1$ respectively.

Embodiment 3—Approach 2

In an embodiment of this approach, the wireless communication node switches from the directional LBT scheme to the omnidirectional LBT scheme in response to a first downlink signal including LBT scheme switching information transmitted from a network device.

From the perspective of the network device. In an embodiment of this approach, the network device transmits the first downlink signal including the LBT scheme switching information to the wireless communication node to make the wireless communication node switch from the directional LBT scheme to the omnidirectional LBT scheme. In an embodiment, the first downlink signal is transmitted in response to the congestion level of the uplink channel between the wireless communication node and the network device. In this embodiment, the network device determines the congestion level of the uplink channel according to a transmission quality corresponding to the uplink channel, such as whether one or more uplink transmissions are successfully detected (or decoded) by the network device.

It should be noted that, many aspects of Approach 2 in Embodiment 3 are similar to Approach 2 in Embodiment 1 described above, and can be ascertain by referring to the paragraphs above. Similar descriptions will not be repeated herein. It should also be noted that, in some embodiments of Approach 2 in Embodiment 3, thresholds $s2\_3$, $a\_3$, $b\_3$, $e\_3$, $f\_3$ are used in a manner similar to the thresholds $s2\_1$, $a\_1$, $b\_1$, $e\_1$, $f\_1$ described above respectively. In some embodiments, the values of thresholds $s2\_3$, $a\_3$, $b\_3$, $e\_3$, $f\_3$ are equal to, different from, or partially different from the values of the thresholds $s2\_1$, $a\_1$, $b\_1$, $e\_1$, $f\_1$ respectively.

Embodiment 3—Approach 3

In an embodiment of this approach, the wireless communication node switches from the directional LBT scheme to the omnidirectional LBT scheme in response to a second downlink signal including LBT scheme switching information transmitted from a network device.

From the perspective of the network device, in an embodiment of this approach, the network device transmits the second downlink signal including the LBT scheme switching information to the wireless communication node to make the wireless communication node switch from the directional LBT scheme to the omnidirectional LBT scheme. In an embodiment, the second downlink signal is transmitted in response to one or more trigger events corresponding to a congestion level within a service range corresponding to the network device (e.g., an overall congestion level in the service range).

It should be noted that, many aspects of Approach 3 in Embodiment 3 are similar to Approach 3 in Embodiment 1 described above, and can be ascertain by referring to the paragraphs above. Similar descriptions will not be repeated herein.

It should also be noted that, in some embodiments of Approach 3 in Embodiment 3, thresholds $c\_3$, $d\_3$ are used in a manner similar to the thresholds $c\_1$, $d\_1$ described above respectively. In some embodiments, the values of thresholds $c\_3$, $d\_3$ are equal to, different from, or partially different from the values of the thresholds $c\_1$, $d\_1$ respectively.

Embodiment 4

In Embodiment 4, a network device switches from the No LBT scheme to the directional LBT scheme. In some embodiments, there are two approaches for the LBT switching.

Embodiment 4—Approach 1

In an embodiment, the network device switches from the No LBT scheme to the directional LBT scheme in response to a congestion level of a downlink between the network device and a wireless communication node. In this embodiment, the network device determines the congestion level of the downlink channel according to a transmission quality corresponding to the downlink channel, such as whether one or more downlink transmissions are successfully detected (or decoded) by the wireless communication node.

In an embodiment, the network device measures the transmission quality according to feedback information from the wireless communication node. In an embodiment, the feedback information may include HARQ-ACK information. In an embodiment, the feedback information corresponds to whether one or more downlink transmissions are successfully detected/decoded.

In an embodiment, the network device determines the congestion level corresponding to at least one of an amount of NACK signals received by the network device, a NACK probability corresponding to the downlink channel, a no-feedback-time corresponding to the downlink channel, a number of times of re-transmissions performed by the network device, a re-transmission probability corresponding to the downlink channel, an amount of ACK signals received by the network device, and/or an ACK probability corresponding to the downlink channel.

In an embodiment, the amount of NACK signals received by the network device can be the amount of NACK signals received by the network device corresponding to the downlink channel within a configured time or in an unlimited time period. In an embodiment, the amount of NACK signals described here can be the amount of NACK signals in one HARQ process or the accumulated amount of NACK signals in multiple HARQ processes.

In an embodiment, the NACK probability corresponding to the downlink channel can be determined according to the amounts of NACK and ACK signals received by the wireless communication node corresponding to the downlink channel within a configured time (can be the same as or different from the configured time mentioned above) or in an unlimited time period. In an embodiment, the NACK probability can be calculated by dividing the amount of NACK signal by a summation of the amount of NACK signals and the amount of ACK signals.

In an embodiment, the no-feedback-time corresponding to the downlink channel can be the time the network device not receiving feedback information from the wireless communication node after a transmission via the downlink channel. By using the no-feedback-time for determination of the congestion level, it can be avoided that the network device is not able to receive the NACK signals/messages due to any unexpected reason (e.g., downlink LBT failure).

In an embodiment, the number of times of re-transmissions performed by the network device can be the number of times of re-transmissions performed by the network device corresponding to the downlink channel within a configured time (can be the same as or different from the configured time mentioned above) or in an unlimited time period. In an embodiment, the number of times of re-transmissions described here can be the number of times of re-transmissions in one HARQ process or the accumulated number of times of re-transmissions in multiple HARQ processes.

In an embodiment, the re-transmission probability corresponding to the downlink channel can be determined according to the numbers of times of re-transmissions or new-transmissions performed by the wireless communication node corresponding to the downlink channel within a configured time (can be the same as or different from anyone of the configured time mentioned above) or in an unlimited time period. In some embodiments, the new-transmissions performed by the wireless communication node correspond to a feedback from the network device indicating that the previous downlink transmission is decoded successfully, while the re-transmissions performed by the wireless communication node correspond to another feedback from the network device indicating that the previous downlink transmission is decoded unsuccessfully. In an embodiment, the re-transmission probability can be calculated by dividing the number of times of re-transmissions by a summation of the number of times of re-transmissions and the number of times of new-transmissions.

In an embodiment, the amount of ACK signals received by network device can be the amount of ACK signals received by the network device corresponding to the downlink channel within a configured time (can be the same as or different from anyone of the configured time mentioned above) or in an unlimited time period. In an embodiment, the amount of ACK signals described here can be the amount of ACK signals in one HARQ process or the accumulated amount of ACK signals in multiple HARQ processes.

In an embodiment, the ACK probability corresponding to the downlink channel can be determined according to the amounts of NACK and ACK signals received by the wireless communication node corresponding to the downlink channel within a configured time (can be the same as or different from anyone of the configured time mentioned above) or in an unlimited time period. In an embodiment, the ACK probability can be calculated by dividing the amount of NACK signal by a summation of the amount of NACK signals and the amount of ACK signals.

In some embodiments, the network device determines the congestion level of the downlink channel corresponding to a radio quality. In an embodiment, the radio quality corresponds to the downlink channel, in an embodiment, the radio quality corresponds to a signal strength. In an embodiment, the radio quality corresponds to a signal to noise ratio (SNR) or a reference signal received power (RSRP).

In an embodiment, the network device determines the congestion level according to both the radio quality and the transmission quality. For example, the network device may determine the congestion level is relatively high in response to the transmission quality is weaker than a certain criteria (e.g., many uplink transmissions cannot be successfully detected by the wireless communication node) and the radio quality is greater than another certain criteria. In this manner, it can avoid the network device incorrectly determines the congestion level is relatively high due to the radio quality is bad.

In an embodiment, the network device determines the congestion level is relatively high and switches from the No LBT scheme to the directional LBT scheme in response to the SNR or the RSRP described above is greater than or equal to a threshold s1_4, and at least one of the following conditions:

the amount of NACK signals received by the network device is greater than or equal to a threshold n_4, the NACK probability corresponding to the downlink channel is greater than or equal to a threshold p_4, the no-feedback-time corresponding to the downlink channel is greater than or equal to a threshold tf_4.

the number of times of re-transmissions performed by the network device is greater than or equal to a threshold m_4;

the re-transmission probability corresponding to the downlink channel is greater than or equal to a threshold q_4, the amount of ACK signals received by the network device is less than a threshold x_4, or the ACK probability corresponding to the downlink channel is less than a threshold y_4.

In an embodiment, one or more of the thresholds s1_4, n_4, p_4, tf_4, m_4, q_4, x_4, y_4 can be predetermined or configured by another device.

From the perspective of the wireless communication node. In an embodiment, the wireless communication node transmits the feedback information to the network device, to allow the wireless communication node to determine the congestion level of the downlink channel and operably switch from the No LBT scheme to the directional LBT scheme in response to the feedback information. In an embodiment, the feedback information may include HARQ-ACK information. In an embodiment the feedback information corresponds to whether one or more downlink transmissions are successfully detected/decoded.

Embodiment 4—Approach 2

In an embodiment, the network device switches from the No LBT scheme to the directional LBT scheme in response to one or more trigger events corresponding to a congestion level within a service range corresponding to the network device (e.g., an overall congestion level in the service range).

In an embodiment, the one or more trigger events include at least one of whether another wireless system (e.g., a WiFi system) existing in the service range, a number of nodes accessing the network device, and/or an overall probability of decoding error (or detection error) of the network device.

Details of the overall probability of decoding error can be ascertained with reference to the paragraphs above, and will not be repeated herein.

In an embodiment, the network device determines the overall congestion level in the service range is relatively high and switches from the No LBT scheme to the directional LBT scheme in response to at least one of the following conditions:
 another wireless system exists in the service range,
 a number of nodes accessing the network device is greater than or equal to a threshold c_4, or
 an overall probability of decoding error of the network device is greater than or equal to a threshold d_4.

Embodiment 5 and Embodiment 6

In Embodiment 5, a network device switches from the No LBT scheme to the omnidirectional LBT scheme. In some embodiments, similar to Embodiment 4, there are two approaches for the LBT switching.

In Embodiment 6, a network device switches from the directional LBT scheme to the omnidirectional LBT scheme. In some embodiments, similar to Embodiment 4, there are two approaches for the LBT switching.

It should be noted that, many aspects of Embodiments 5 and 6 are similar to Embodiment 4 described above, and can be ascertain by referring to the paragraphs above. Similar descriptions will not be repeated herein.

Besides, in some embodiments, thresholds s1_5, n_5, p_5, tf_5, m_5, q_5, x_5, y_5, c_5, d_5 in Embodiment 5 are used in a manner similar to the thresholds s1_4, n_4, p_4, tf_4, m_4, q_4, x_4, y_4, c_4, d_4 in Embodiment 4 respectively. In some embodiments, the values of thresholds s1_5, n_5, p_5, tf_5, m_5, q_5, x_5, y_5, c_5, d_5 are equal to, different from, or partially different from the values of the thresholds s1_4, n_4, p_4, tf_4, m_4, q_4, xy_4, c_4, d_4 respectively.

Similarly, in some embodiments, thresholds s1_6, n_6, p_6, tf_6, m_6, q_6, x_6, y_6, c_6, d_6 in Embodiment 6 are used in a manner similar to the thresholds s1_4, n_4, p_4, tf_4, m_4, q_4, x_4, y_4, c_4, d_4 in Embodiment 4 respectively. In some embodiments, the values of thresholds s_6, n_6, p_6, tf_6, m_6, q_6, x_6, y_6, c_6, d_6 in Embodiment are equal to, different from, or partially different from the values of the thresholds s1_4, n_4, p_4, tf_4, m_4, q_4, x_4, y_4, c_4, d_4 respectively.

Embodiment 7

In Embodiment 7, a wireless communication node switches from the directional LBT scheme to the No LBT scheme. In some embodiments, there are three approaches for the LBT switching.

Embodiment 7—Approach 1 in an embodiment, the wireless communication node switches from the directional LBT scheme to the No LBT scheme in response to a congestion level of an uplink channel between the wireless communication node and a network device. In this embodiment, the wireless communication node determines the congestion level of the uplink channel according to a transmission quality corresponding to the uplink channel, such as whether one or more uplink transmissions are successfully detected for decoded) by the network device.

In an embodiment, the wireless communication node measures the transmission quality according to feedback information from the network device. In an embodiment, the feedback information may include HARQ-ACK information. In an embodiment, the feedback information corresponds to whether one or more uplink transmissions are successfully detected/decoded.

In an embodiment, the wireless communication node determines the congestion level corresponding to at least one of an amount of NACK signals received by the wireless communication node, a NACK probability corresponding to the uplink channel, a number of times of re-transmissions performed by the wireless communication node, a re-transmission probability corresponding to the uplink channel, an amount of ACK signals received by the wireless communication node, and/or an ACK probability corresponding to the uplink channel.

Details of the amount of NACK signals received by the wireless communication node, the NACK probability corresponding to the uplink channel, the number of times of re-transmissions performed by the wireless communication node, the re-transmission probability corresponding to the uplink channel, the amount of ACK signals received by the wireless communication node, and the ACK probability corresponding to the uplink channel can be ascertained with reference to the paragraphs above, and will not be repeated herein. In an embodiment, the wireless communication node determines the congestion level is relatively low and switches from the directional LBT scheme to the No LBT scheme in response to at least one of the following conditions:
 the amount of NACK signals received by the wireless communication node is less than a threshold n_7,
 the NACK probability corresponding to the uplink channel is less than a threshold p_7,
 the number of times of re-transmissions performed by the wireless communication node less than a threshold m_7;
 the re-transmission probability corresponding to the uplink channel is less than a threshold q_7, the amount of ACK signals received by the wireless communication node is greater than or equal a threshold x_7, or the ACK probability corresponding to the uplink channel is greater than or equal a threshold y_7.

In an embodiment, one or more of the thresholds n_7, p_7, m_7, q_7, x_7, y_7 can be predetermined or configured by another device. For example, these thresholds may be configured by using broadcast SI message. RRC message, or another feasible message from the network device.

From the perspective of the network device. In an embodiment, the network device transmits the feedback information to the wireless communication node, to allow the wireless communication node to determine the congestion level of the uplink channel and operably switch from the directional LBT scheme to the No LBT scheme in response to the feedback information. In an embodiment, the feedback information may include HARQ-ACK information. In an embodiment, the feedback information corresponds to whether one or more uplink transmissions are successfully detected/decoded.

Embodiment 7—Approach 2

In an embodiment, the wireless communication node switches from the directional LBT scheme to the No LBT scheme in response to a first downlink signal including LBT scheme switching information transmitted from a network device. In this embodiment, the first downlink signal is a device-specific signal. That is, only said wireless communication node in a service range corresponding to the network device can receive the first downlink signal. For example, the first downlink signal is a user equipment specific Downlink Control Information (UE specific DCI) signal, or a Medium Access Control Control Element (MAC CE).

From the perspective of the network device. In an embodiment, the network device transmits the first downlink signal including the LBT scheme switching information to the wireless communication node to make the wireless communication node switch from the directional LBT scheme to the No LBT scheme.

In an embodiment, the first downlink signal is transmitted in response to the congestion level of the uplink channel between the wireless communication node and the network device, in this embodiment, the network device determines the congestion level of the uplink channel according to a transmission quality corresponding to the uplink channel, such as whether one or more uplink transmissions are successfully detected (or decoded) by the network device.

In an embodiment, the network device determines the congestion level corresponding to at least one of a number of times of failed detections of uplink transmissions, a probability of failed detections of uplink transmissions, a number of times of successful detections of uplink transmissions, and/or a probability of successful detections of uplink transmissions.

Details of the number of times of failed detections of uplink transmissions, the probability of failed detections of uplink transmissions, the number of times of successful detections of uplink transmissions, and the probability of successful detections of uplink transmissions can be ascertained with reference to the paragraphs above, and will not be repeated herein.

In an embodiment, the network device determines the congestion level is relatively low and transmits the first downlink signal including a piece of a second type of LBT scheme switching information to make the wireless communication node switch from the directional LBT scheme to the No LBT scheme in response at least one of the following conditions:

the number of times of failed detections of uplink transmissions is less than a threshold a_7, or the probability of failed detections of uplink transmissions is less than a threshold b_7, the number of times of successful detections or uplink transmissions is greater than or equal to a threshold e_7, or the probability of successful detections of uplink transmissions is greater than or equal to a threshold f_7.

In an embodiment, one or more of the thresholds a_7, b_7, e_7, f_7 can be predetermined or configured by another device.

In an embodiment, the first downlink signal including the second type of LBT scheme switching information is used to make the wireless communication node switch from an LBT scheme corresponding to a relatively low congestion level to an LBT scheme corresponding to a relatively high congestion level, such as from the omnidirectional LBT scheme to the No LBT scheme or the directional LBT scheme, or from the directional LBT scheme to the No LBT scheme.

In an embodiment, the network device transmits the first downlink signal including the piece of the second type of LBT scheme switching information in response to the wireless communication node being in the omnidirectional LBT scheme or the directional LBT scheme. That is, if the wireless communication node is in the No LBT scheme, the network device may decide not to transmit the first downlink signal including the piece of the second type of LBT scheme switching information to the wireless communication node because it may not make any change.

Embodiment 7—Approach 3

In an embodiment, the wireless communication node switches from the directional LBT scheme to the No LBT scheme in response to a second downlink signal including LBT scheme switching information transmitted from a network device. In this embodiment, the second downlink signal is a common signal. That is, all wireless communication nodes in a service range corresponding to the network device can receive the second downlink signal. For example, the second downlink signal is a common Downlink Control Information (DCI) signal, a broadcast system information (SI) message, or a Radio Resource Control (RRC) message.

From the perspective of the network device. In an embodiment, the network device transmits the second downlink signal including the LBT scheme switching information to the wireless communication node to make the wireless communication node switch from the directional LBT scheme to the No LBT scheme.

In an embodiment, the second downlink signal is transmitted in response to one or more trigger events corresponding to a congestion level within a service range corresponding to the network device (e.g., an overall congestion level in the service range). In an embodiment, the one or more trigger events include at least one of whether another wireless system (e.g., a WiFi system) existing in the service range, a number of nodes accessing the network device, and/or an overall probability of decoding error (or detection error) of the network device.

Details of the overall probability of decoding error can be ascertained with reference to the paragraphs above, and will not be repeated herein.

In an embodiment, the network device determines the overall congestion level in the service range is relatively low and transmits the second downlink signal including a piece of a second type of LBT scheme switching information to make the wireless communication node switch from the directional LBT scheme to the No LBT scheme in response to at least one of the following conditions:

no other wireless system exists in the service range.
a number of nodes accessing the network device is less than a threshold $c\_7$, or
an overall probability of decoding error of the network device is less than a threshold $d\_7$.

In an embodiment, the second downlink signal including the second type of LBT scheme switching information is used to make the wireless communication node switch from an LBT scheme corresponding to a relatively low congestion level to an LBT scheme corresponding to a relatively high congestion level, such as from the omnidirectional LBT scheme to the No LBT scheme or the directional LBT scheme, or from the directional LBT scheme to the No LBT scheme.

In an embodiment, the network device transmits the second downlink signal including the piece of the second type of LBT scheme switching information in response to the wireless communication node being in the No LBT scheme or the directional LBT scheme. That is, if the wireless communication node is in the omnidirectional LBT scheme, the network device may decide not to transmit the second downlink signal including the piece of the second type of LBT scheme switching information to the wireless communication node because it may not make any change.

Embodiment 8 and Embodiment 9

In Embodiment 8, a network device switches from the omnidirectional LBT scheme to the No LBT scheme. In some embodiments, similar to Embodiment 7, there are three approaches for the LBT switching.

In Embodiment 9, a network device switches from the omnidirectional LBT scheme to the directional LBT scheme. In some embodiments, similar to Embodiment 7, there are three approaches for the LBT switching.

It should be noted that, many aspects of Embodiments 8 and 9 are similar to Embodiment 7 described above, and can be ascertain by referring to the paragraphs above. Similar descriptions will not be repeated herein.

Besides, in some embodiments, thresholds $n\_8$, $p\_8$, $m\_8$, $q\_8$, $x\_8$, $y\_8$, $a\_8$, $b\_8$, $c\_8$, $d\_8$, $e\_8$, $f\_8$ in Embodiment 8 are used in a manner similar to the thresholds $n\_7$, $p\_7$, $m\_7$, $q\_7$, $x\_7$, $y\_7$, $a\_7$, $b\_7$, $c\_7$, $d\_7$, $e\_7$, $f\_7$ in Embodiment 7 respectively. In some embodiments, the values of thresholds $n\_8$, $p\_8$, $m\_8$, $q\_8$, $x\_8$, $y\_8$, $a\_8$, $b\_8$, $c\_8$, $d\_8$, $e\_8$, $f\_8$ are equal to, different from, or partially different from the values of the thresholds $n\_7$, $p\_7$, $m\_7$, $q\_7$, $x\_7$, $y\_7$, $a\_7$, $b\_7$, $c\_7$, $d\_7$, $e\_7$, $f\_7$ respectively.

Similarly, in some embodiments, thresholds $n\_9$, $p\_9$, $m\_9$, $q\_9$, $x\_9$, $y\_9$, $a\_9$, $b\_9$, $c\_9$, $d\_9$, $e\_9$, $f\_9$ in Embodiment 9 are used in a manner similar to the thresholds $n\_7$, $p\_7$, $m\_7$, $q\_7$, $x\_7$, $y\_7$, $a\_7$, $b\_7$, $c\_7$, $d\_7$, $e\_7$, $f\_7$ in Embodiment 7 respectively. In some embodiments, the values of thresholds $n\_9$, $p\_9$, $m\_9$, $q\_9$, $x\_9$, $y\_9$, $a\_9$, $b\_9$, $c\_9$, $d\_9$, $e\_9$, $f\_9$ are equal to, different from, or partially different from the values of the thresholds $n\_7$, $p\_7$, $m\_7$, $q\_7$, $x\_7$, $y\_7$, $a\_7$, $b\_7$, $c\_7$, $d\_7$, $e\_7$, $f\_7$ respectively.

Embodiment 10

In Embodiment 10, a network device switches from the No LBT scheme to the directional LBT scheme. In some embodiments, there are two approaches for the LBT switching.

Embodiment 10—Approach 1

In an embodiment, the network device switches from the directional LBT scheme to the No LBT scheme in response to a congestion level of a downlink between the network device and a wireless communication node. In this embodiment, the network device determines the congestion level of the downlink channel according to a transmission quality corresponding to the downlink channel, such as whether one or more downlink transmissions are successfully detected (or decoded) by the wireless communication node.

In an embodiment, the network device measures the transmission quality according to feedback information from the wireless communication node. In an embodiment, the feedback information may include HARQ-ACK information. In an embodiment, the feedback information corresponds to whether one or more downlink transmissions are successfully detected/decoded.

In an embodiment, the network device determines the congestion level corresponding to at least one of an amount of NACK signals received by the network device, a NACK probability corresponding to the downlink channel, a number of times of re-transmissions performed by the network device, a re-transmission probability corresponding to the downlink channel, an amount of ACK signals received by the network device, and/or an ACK probability corresponding to the downlink channel.

Details of the amount of NACK signals received by the network device, the NACK probability corresponding to the downlink channel, the number of times of re-transmissions performed by the network device, the re-transmission probability corresponding to the downlink channel, the amount of ACK signals received by the network device, and the ACK probability corresponding to the downlink channel can be ascertained with reference to the paragraphs above, and will not be repeated herein.

In an embodiment, the network device determines the congestion level is relatively low and switches from the directional LBT scheme to the No LBT scheme in response to at least one of the following conditions:

the amount of NACK signals received by the network device is less than a threshold $n\_10$,
the NACK probability corresponding to the downlink channel is less than a threshold $p\_10$,
the number of times of re-transmissions performed by the network device is less than a threshold $m\_10$;
the re-transmission probability corresponding to the downlink channel is less than a threshold $q\_10$,
the amount of ACK signals received by the network device is greater than or equal to a threshold $x\_10$, or
the ACK probability corresponding to the downlink channel is greater than or equal to a threshold $y\_10$.

In an embodiment, one or more of the thresholds $n\_10$, $p\_10$, $m\_10$, $q\_10$, $x\_10$, $y\_10$ can be predetermined or configured by another device.

From the perspective of the wireless communication node. In an embodiment, the wireless communication node transmits the feedback information to the network device, to allow the wireless communication node to determine the congestion level of the downlink channel and operably switch from the directional LBT scheme to the No LBT scheme in response to the feedback information. In an embodiment, the feedback information may include HARQ-ACK information. In an embodiment, the feedback information corresponds to whether one or more downlink transmissions are successfully detected/decoded.

Embodiment 10—Approach 2

In an embodiment, the network device switches from the directional LBT scheme to the No LBT scheme in response to one or more trigger events corresponding to a congestion level within a service range corresponding to the network device (e.g., an overall congestion level in the service range).

In an embodiment, the one or more trigger events include at least one of whether another wireless system (e.g., a WiFi system) existing in the service range, a number of nodes accessing the network device, and/or an overall probability of decoding error (or detection error) of the network device.

Details of the overall probability of decoding error can be ascertained with reference to the paragraphs above, and will not be repeated herein.

In an embodiment, the network device determines the overall congestion level in the service range is relatively low and switches from the directional LBT scheme to the No LBT scheme in response to at least one of the following conditions:
no other wireless system exists in the service range,
a number of nodes accessing the network device is less than a threshold c_10, or
an overall probability of decoding error of the network device is less than a threshold d_10.

Embodiment 11 and Embodiment 12

In Embodiment 11, a network device switches from the omnidirectional LBT scheme to the No LBT scheme. In some embodiments, similar to Embodiment 10, there are two approaches for the LBT switching.

In Embodiment 12, a network device switches from the omnidirectional LBT scheme to the directional LBT scheme. In some embodiments, similar to Embodiment 10, there are two approaches for the LBT switching.

It should be noted that, many aspects of Embodiments 11 and 12 are similar to Embodiment 10 described above, and can be ascertain by referring to the paragraphs above. Similar descriptions will not be repeated herein.

Besides, in some embodiments, thresholds n_11, p_11, m_11, q_11, x_11, y_11, c_11, d_11 in Embodiment 11 are used in a manner similar to the thresholds n_10, p_10, m_10, q_10, x_10, y_10, c_10, d_10 in Embodiment 10 respectively. In some embodiments, the values of thresholds n_11, p_11, m_11, q_11, x_11, y_11, c_11, d_11 are equal to, different from, or partially different from the values of the thresholds n_10, p_10, m_10, q_10, x_10, y_10, c_10, d_10 respectively.

Similarly, in some embodiments, thresholds n_12, p_12, m_12, q_12, x_12, y_12, c_12, d_12 in Embodiment 12 are used in a manner similar to the thresholds n_10, p_10, m_10, q_10, x_10, y_10, c_10, d_10 in Embodiment 10 respectively. In some embodiments, the values of thresholds n_12, p_12, m_12, q_12, x_12, y_12, c_12, d_12 in Embodiment are equal to, different from, or partially different from the values of the thresholds n_10, p_10, m_10, q_10, x_10, y_10, c_10, d_10 respectively, FIG. 4 relates to a schematic diagram of a wireless communication node 40 (e.g., a wireless terminal) according to an embodiment of the present disclosure. The wireless communication node 40 may be a user equipment (UE), a mobile phone, a laptop, a tablet computer, an electronic book or a portable computer system and is not limited herein. The wireless communication node 40 may include a processor 400 such as a microprocessor or Application Specific Integrated Circuit (ASIC), a storage unit 410 and a communication unit 420. The storage unit 410 may be any data storage device that stores a program code 412, which is accessed and executed by the processor 400. Embodiments of the storage unit 410 include but are not limited to a subscriber identity module (SIM), read-only memory (ROM), flash memory, random-access memory (RAM), hard-disk, and optical data storage device. The communication unit 420 may a transceiver and is used to transmit and receive signals (e.g. messages or packets) according to processing results of the processor 400. In an embodiment, the communication unit 420 transmits and receives the signals via at least one antenna 422 shown in FIG. 4.

In an embodiment, the storage unit 410 and the program code 412 may be omitted and the processor 400 may include a storage unit with stored program code.

The processor 400 may implement any one of the steps in exemplified embodiments on the wireless communication node 40, e.g., by executing the program code 412.

The communication unit 420 may be a transceiver. The communication unit 420 may as an alternative or in addition be combining a transmitting unit and a receiving unit configured to transmit and to receive, respectively, signals to and from a network device.

In some embodiments, the wireless communication node 40 can be used to perform the operations described above (e.g., operations in the method 100, and other relevant operations). In some embodiments, the processor 400 and the communication unit 420 collaboratively perform the operations described above. For example, the processor 400 performs operations and transmit or receive information through the communication unit 420.

In an embodiment, the processor 400 is configured to switch from a first LBT scheme to a second uplink LBT scheme in response to a congestion level of an uplink channel between the wireless communication node and the network device or in response to a first or second downlink signal including LBT scheme switching information transmitted from the network device.

Details of operations of the wireless communication node 40 can be ascertained with reference to the embodiments above, and will not be described herein.

Figure 5:
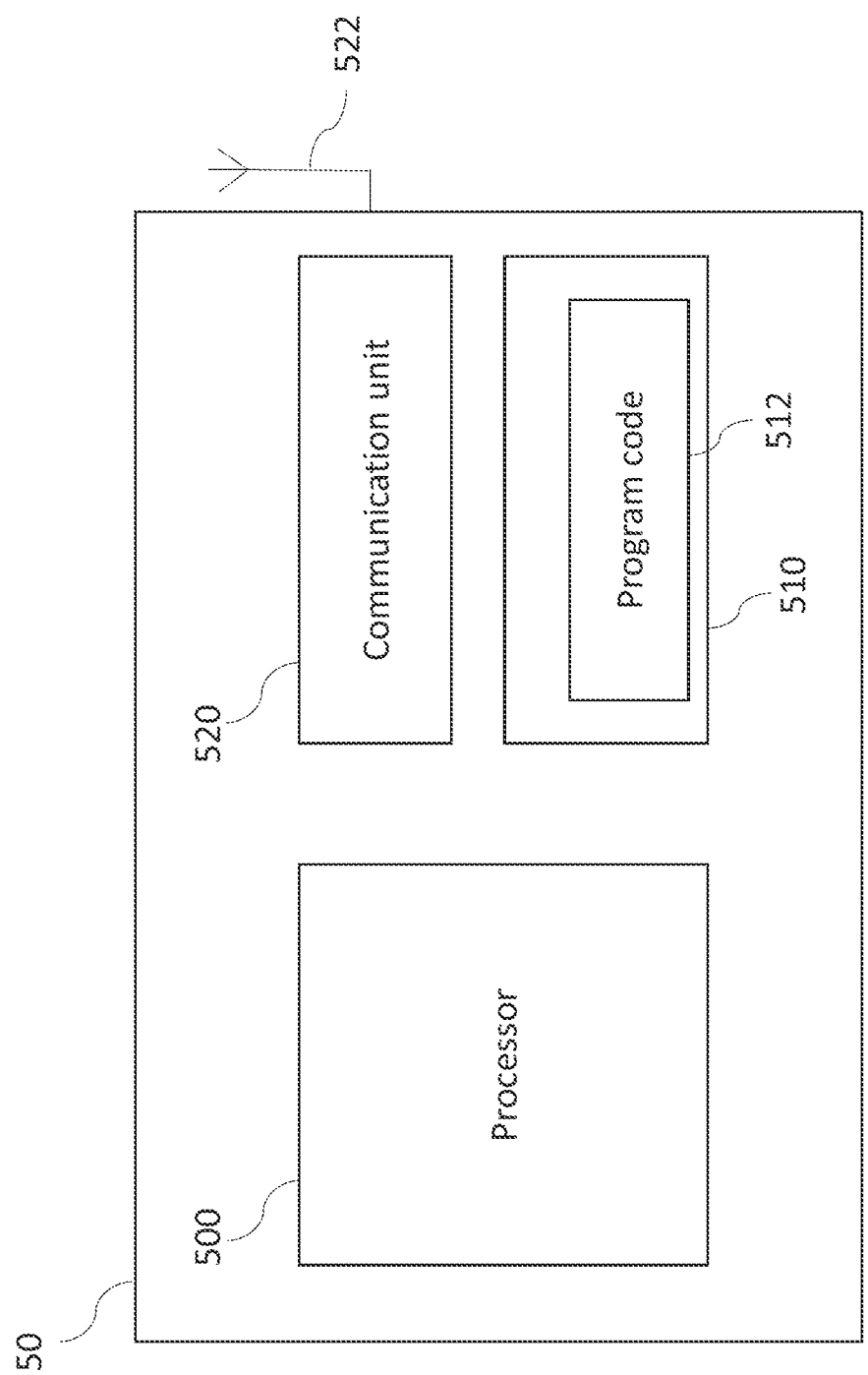
FIG. 5 shows a schematic diagram of a network device according to an embodiment of the present disclosure.

FIG. 5 relates to a schematic diagram of a network device according to an embodiment of the present disclosure. The network device 50 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the network device 50 may include (perform) at least one network function such as an access and mobility management function (AMF), a session management function (SMF), a user place function (UPF), a policy control function (PCF), an application function (AF), etc. The network device 50 may include a processor 500 such as a microprocessor or ASIC, a storage unit 510 and a communication unit 520. The storage unit 510 may be any data storage device that stores a program code 512, which is accessed and executed by the processor 500. Examples of the storage unit 510 include but are not limited to a SIM, ROM, flash memory, RAM, hard-disk, and optical data storage device. The communication unit 520 may be a transceiver and is used to transmit and receive signals (e.g. messages or packets) according to processing results of the processor 500. In an example, the communication unit 520 transmits and receives the signals via at least one antenna 522 shown in FIG. 5. In an embodiment, the communication unit 520 may also transmit and receive the signals via physical wires/cables.

In an embodiment, the storage unit 510 and the program code 512 may be omitted. The processor 500 may include a storage unit with stored program code.

The processor 500 may implement any steps described in exemplified embodiments on the network device 50, e.g., via executing the program code 512.

The communication unit 520 may be a transceiver. The communication unit 520 may as an alternative or in addition be combining a transmitting unit and a receiving unit configured to transmit and to receive, respectively, signals to and from a communication device (e.g. a user equipment).

In some embodiments, the network device 50 can be used to perform the operations described above (e.g., operations in the method 100, and other relevant operations). In some embodiments, the processor 500 and the communication unit 520 collaboratively perform the operations described above. For example, the processor 500 performs operations and transmit or receive signals through the communication unit 520.

In an embodiment, the processor 500 is configured to transmit, through the communication unit 520, a first or second downlink signal including Listen Before Talk, LBT, scheme switching information to make the wireless communication node switch from a first uplink LBT scheme to a second uplink LBT scheme.

In an embodiment, the processor 50M is configured to switch from a first downlink Listen Before Talk, LBT, scheme to a second downlink LBT scheme in response to a congestion level of a downlink channel between the network device and the wireless communication node, or in response to one or more trigger events corresponding to a congestion level within a service range corresponding to the network device.

Details of operations of the network device 50 can be ascertained with reference to the embodiments above, and will not be described herein.

Another aspect of the present disclosure relates to a computer program product including a computer-readable program medium code stored thereupon, the code, when executed by a processor, causing the processor to implement a wireless communication method recited in any of foregoing methods.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, pocessors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "sotware" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:
switching, by a wireless communication node, from a first uplink Listen Before Talk (LBT) scheme to a second uplink LBT scheme in response to a congestion level of an uplink channel between the wireless communication node and a network device or in response to a first or second downlink signal comprising LBT scheme switching information transmitted from the network device;
wherein the wireless communication node switches from a No LBT scheme to an omnidirectional LBT scheme or a directional LBT scheme, or from the directional LBT scheme to the omnidirectional LBT scheme, in response to a signal to noise ratio or a reference signal received power is greater than or equal to a first threshold, and at least one of the following conditions:
an amount of negative acknowledgement (NACK) signals received by the wireless communication node is greater than or equal to a second threshold,
a NACK probability corresponding to the uplink channel is greater than or equal to a second threshold,
a no-feedback-time corresponding to the uplink channel is greater than or equal to a second threshold,
a number of times of re-transmissions performed by the wireless communication node is greater than or equal to a second threshold,
a re-transmission probability corresponding to the uplink channel is greater than or equal to a second threshold,
an amount of acknowledgement (ACK) signals received by the wireless communication node is less than a second threshold, or
an ACK probability corresponding to the uplink channel is less than a second threshold,
wherein the congestion level of the uplink channel is determined according to whether one or more uplink transmissions are successfully detected by the network device, and
wherein the congestion level of the uplink channel corresponds to at least one of an amount of NACK signals received by the wireless communication node, a NACK probability corresponding to the uplink channel, a no-feedback-time corresponding to the uplink channel, a number of times of re-transmissions performed by the wireless communication node, a re-transmission probability corresponding to the uplink channel, an amount of ACK signals received by the wireless communication node, or an ACK probability corresponding to the uplink channel.

2. The wireless communication method of claim 1, wherein the congestion level is determined corresponding to a radio quality,
wherein the radio quality corresponds to a signal strength, or
wherein the radio quality corresponds to a signal to noise ratio or a reference signal received power.

3. The wireless communication method of claim 1, wherein the first uplink LBT scheme and the second uplink LBT scheme are two of a No LBT scheme, an omnidirectional LBT scheme, or a directional LBT scheme.

4. The wireless communication method of claim 1, wherein the wireless communication node switches from an omnidirectional LBT scheme to a No LBT scheme or a directional LBT scheme, or from the directional LBT scheme to the No LBT scheme, in response to at least one of following conditions:
an amount of NACK signals received by the wireless communication node is less than a third threshold,
a NACK probability corresponding to the uplink channel is less than a third threshold,
a number of times of re-transmissions performed by the wireless communication node is less than a third threshold,
a re-transmission probability corresponding to the uplink channel is less than a third threshold,
an amount of ACK signals received by the wireless communication node is greater than or equal to a third threshold, or
an ACK probability corresponding to the uplink channel is greater than or equal to a third threshold.

5. The wireless communication method of claim 1, wherein the first downlink signal is a user equipment specific Downlink Control Information signal, or a Medium Access Control Control Element (MAC CE);
wherein the second downlink signal is a common Downlink Control Information signal, a broadcast system information message, or a Radio Resource Control message.

6. The wireless communication method of claim 1, further comprising:
transmitting, by the wireless communication node to the network device, feedback information corresponding to a congestion level of a downlink channel, to make the network device switch from a first downlink LBT scheme to a second downlink LBT according to the feedback information.

7. A wireless communication method comprising:
transmitting, by a network device to a wireless communication node, a first or second downlink signal comprising Listen Before Talk (LBT) scheme switching information to make the wireless communication node switch from a first uplink LBT scheme to a second uplink LBT scheme,
wherein the first downlink signal is transmitted in response to a congestion level of an uplink channel between the wireless communication node and the network device, and the second downlink signal is transmitted in response to one or more trigger events corresponding to a congestion level within a service range corresponding to the network device,
wherein the wireless communication node switches from a No LBT scheme to an omnidirectional LBT scheme or a directional LBT scheme, or from the directional LBT scheme to the omnidirectional LBT scheme, in response to a signal to noise ratio or a reference signal received power is greater than or equal to a first threshold, and at least one of the following conditions:
an amount of negative acknowledgement (NACK) signals received by the wireless communication node is greater than or equal to a second threshold,
a NACK probability corresponding to the uplink channel is greater than or equal to a second threshold,
a no-feedback-time corresponding to the uplink channel is greater than or equal to a second threshold,
a number of times of re-transmissions performed by the wireless communication node is greater than or equal to a second threshold,
a re-transmission probability corresponding to the uplink channel is greater than or equal to a second threshold,
an amount of acknowledgement (ACK) signals received by the wireless communication node is less than a second threshold, or
an ACK probability corresponding to the uplink channel is less than a second threshold,
wherein the congestion level of the uplink channel is determined according to whether one or more uplink transmissions are successfully detected by the network device, and
wherein the congestion level of the uplink channel corresponds to at least one of an amount of NACK signals received by the wireless communication node, a NACK probability corresponding to the uplink channel, a no-feedback-time corresponding to the uplink channel, a number of times of re-transmissions performed by the wireless communication node, a re-transmission probability corresponding to the uplink channel, an amount of ACK signals received by the wireless communication node, or an ACK probability corresponding to the uplink channel.

8. The wireless communication method of claim 7, further comprising:
transmitting, by the network device to the wireless communication node, feedback information corresponding to the congestion level of the uplink channel, to make the wireless communication node operably switch from the first uplink LBT scheme to the second uplink LBT scheme according to the feedback information.

9. The wireless communication method of claim 7, wherein the congestion level of the uplink channel corresponds to at least one of a number of times of failed detections of uplink transmissions, a probability of failed detections of uplink transmissions, a number of times of successful detections of uplink transmissions, or a probability of successful detections of uplink transmissions.

10. The wireless communication method of claim 7, wherein the congestion level is determined corresponding to a radio quality; and
wherein the radio quality corresponds to a signal strength; or
wherein the radio quality corresponds to a signal to noise ratio or a reference signal received power.

11. The wireless communication method of claim 7, wherein the first uplink LBT scheme and the second uplink LBT scheme are two of a No LBT scheme, an omnidirectional LBT scheme, or a directional LBT scheme.

12. The wireless communication method of claim 7, wherein the network device transmits the first downlink signal comprising a piece of a first type of LBT scheme switching information to make the wireless communication node switch from the first uplink LBT scheme to the second uplink LBT scheme in response to a signal to noise ratio or a reference signal received power is greater than or equal to the first threshold, and at least one of following conditions:
a number of times of failed detections of uplink transmissions is greater than or equal to a third threshold,
a probability of failed detections of uplink transmissions is greater than or equal to a third threshold,
a number of times of successful detections of uplink transmissions is less than a third threshold, or
a probability of successful detections of uplink transmissions is less than a third threshold,
wherein the network device transmits the first downlink signal comprising the piece of the first type of LBT scheme switching information in response to the first uplink LBT scheme of the wireless communication node being a No LBT scheme or a directional LBT scheme.

13. The wireless communication method of claim 7, wherein the network device transmits the first downlink signal comprising a piece of a second type of LBT scheme switching information to make the wireless communication node switch from the first uplink LBT scheme to the second uplink LBT scheme in response to at least one of following conditions:
a number of times of failed detections of uplink transmissions is less than a third threshold,
a probability of failed detections of uplink transmissions is less than a third threshold,
a number of times of successful detections of uplink transmissions is greater than or equal to a third threshold, or
a probability of successful detections of uplink transmissions is greater than or equal to a third threshold, wherein the network device transmits the first downlink signal comprising the piece of the second type of LBT scheme switching information in response to the first uplink LBT scheme of the wireless communication node being a directional LBT scheme or an omnidirectional LBT scheme, and wherein the first downlink signal is a user equipment specific Downlink Control Information signal, or a Medium Access Control Control Element (MAC CE).

14. The wireless communication method of claim 7, wherein the one or more trigger events comprise at least one of following:
whether another wireless system exists in the service range,
a number of nodes accessing the network device, or
an overall probability of decoding error of the network device.

15. The wireless communication method of claim 7, wherein the network device transmits the second downlink signal comprising a piece of a first type of LBT scheme switching information to make the wireless communication node switch from the first uplink LBT scheme to the second uplink LBT scheme in response to at least one of following conditions:
another wireless system exists in the service range,
a number of nodes accessing the network device is greater than or equal to a third threshold, or
an overall probability of decoding error of the network device is greater than or equal to a third threshold,
wherein the network device transmits the second downlink signal comprising the piece of the first type of LBT scheme switching information in response to the first uplink LBT scheme of the wireless communication node being a No LBT scheme or a directional LBT scheme.

16. The wireless communication method of claim 7, wherein the network device transmits the second downlink signal comprising a piece of a second type of LBT scheme switching information to make the wireless communication node switch from the first uplink LBT scheme to the second uplink LBT scheme in response to at least one of following conditions:
no other wireless system exists in the service range,
a number of nodes accessing the network device is less than a third threshold,
or an overall probability of decoding error of the network device is less than a third threshold,
wherein the network device transmits the second downlink signal comprising the piece of the second type of LBT scheme switching information in response to the first uplink LBT scheme of the wireless communication node being a directional LBT scheme or an omnidirectional LBT scheme, and wherein the second downlink signal is a common Downlink Control Information signal, a broadcast system information message, or a Radio Resource Control message.

17. A wireless communication node comprising:
a communication unit configured to communicate with a network device; and
a processor configured to switch from a first uplink Listen Before Talk (LBT) scheme to a second uplink LBT scheme in response to a congestion level of an uplink channel between the wireless communication node and the network device or in response to a first or second downlink signal comprising LBT scheme switching information transmitted from the network device,
wherein the wireless communication node switches from a No LBT scheme to an omnidirectional LBT scheme or a directional LBT scheme, or from the directional LBT scheme to the omnidirectional LBT scheme, in response to a signal to noise ratio or a reference signal received power is greater than or equal to a first threshold, and at least one of the following conditions:
an amount of negative acknowledgement (NACK) signals received by the wireless communication node is greater than or equal to a second threshold,
a NACK probability corresponding to the uplink channel is greater than or equal to a second threshold,
a no-feedback-time corresponding to the uplink channel is greater than or equal to a second threshold,
a number of times of re-transmissions performed by the wireless communication node is greater than or equal to a second threshold,
a re-transmission probability corresponding to the uplink channel is greater than or equal to a second threshold,
an amount of acknowledgement (ACK) signals received by the wireless communication node is less than a second threshold, or
an ACK probability corresponding to the uplink channel is less than a second threshold,
wherein the congestion level of the uplink channel is determined according to whether one or more uplink transmissions are successfully detected by the network device, and
wherein the congestion level of the uplink channel corresponds to at least one of an amount of NACK signals received by the wireless communication node, a NACK probability corresponding to the uplink channel, a no-feedback-time corresponding to the uplink channel, a number of times of re-transmissions performed by the wireless communication node, a re-transmission probability corresponding to the uplink channel, an amount of ACK signals received by the wireless communication node, or an ACK probability corresponding to the uplink channel.

* * * * *